United States Patent [19]

Avery

[11] Patent Number: 5,320,581
[45] Date of Patent: Jun. 14, 1994

[54] PULLEY ALIGNMENT TOOL

[75] Inventor: Terrance A. Avery, Oakland County, Mich.

[73] Assignee: The United States of America as represented by the Secretary of the Army, Washington, D.C.

[21] Appl. No.: 70,742

[22] Filed: Jun. 2, 1993

[51] Int. Cl.$^5$ .............................................. F16H 7/00
[52] U.S. Cl. ..................................... 474/101; 474/113
[58] Field of Search ................ 474/101, 113, 119–125, 474/128–130

[56] References Cited

U.S. PATENT DOCUMENTS

| | | | |
|---|---|---|---|
| 3,359,689 | 12/1967 | McCarty et al. | 474/123 X |
| 4,557,710 | 12/1985 | Greider | 474/121 X |
| 4,892,508 | 1/1990 | Ryan et al. | 474/101 |

Primary Examiner—Thuy M. Bui
Attorney, Agent, or Firm—Peter A. Taucher; Gail S. Soderling

[57] ABSTRACT

An improved tool is disclosed for use in aligning pulleys. The tool has a T-shaped configuration with multiple engaging pads adapted to align the pulleys with in about 0.2 degrees.

1 Claim, 1 Drawing Sheet

PULLEY ALIGNMENT TOOL

GOVERNMENT INTEREST

The invention described herein may be manufactured, used and licensed by or for the Government for governmental purposes without payment to me of any royalty.

BACKGROUND OF THE INVENTION

1. Field of the Invention

In one aspect this invention relates to the axial alignment of mechanical parts. In yet a further aspect, this invention relates to an improved means for aligning pulleys to prevent destruction of drive belts.

2. Prior Art

Belt drives connecting pulleys are a common means to transfer power from a prime mover to one or more devices. The common V-belt used in land vehicles is the best known example of this type of drive. The V-belts are used to drive a number of components including: alternators, power steering pumps, and power brakes. When a belt breaks or moves off one of the pulleys, a system failure occurs creating an inconvenience at best and an unsafe situation at worst.

It is common to align pulleys by placing a steel rule or other straight edge in the grooves of the pulleys and attempting to align the straight edge by eye. This system provides a minimally acceptable system for standard V-belt drives with small power requirements, where a failure has minimal consequences, and the belts are relatively narrow; however in high load applications or where failure can be catastrophic, misalignment is a greater problem.

In the combat vehicle systems used by military forces, the vehicle prime mover uses a poly-V- belt to power a 24 volt alternator which in turn powers the electrical system that operates all the vehicle systems. Failure of the belt drive will result in a failure of the majority of the vehicle systems. Thus a belt failure will effectively disable the vehicle exposing the crew to the dangers inherent in combat situations. To properly transfer the amount of power required by combat vehicle systems a wide polyvee type belt is generally used. Belts of this description are wide relative to the normal drive belts and require wider pulleys. Such pulleys are more difficult to align and any misalignment will cause the belt to jump off the pulleys.

In wide belt systems when the pulleys are not properly aligned so the axis of rotation of one pulley is the same as the rotational axis of the other pulley with respect to all three degrees of freedom, x, y and z, the belt will tend to "walk" off one of the pulleys disabling the system.

The problem becomes more pronounced the greater the power and the speed. In combat vehicles the alignment must often be made under field conditions where sophisticated equipment is not available and the pulleys must still be accurately aligned. Prior to the present device, pulleys were frequently misaligned using the straight edge method described above when vehicles were repaired under field conditions. Consequently belt failures where the belt came off the pulleys disabling the vehicle were common. There was a need for an alignment device which was strong, light weight, and which could align the pulleys to an accuracy of about 0.2 degrees.

BRIEF SUMMARY OF THE INVENTION

The needs felt by those in the field are met by the improved pulley alignment tool of the present invention. The tool is useful in adjusting the alignment of the rotational axis of a driven pulley connected to a device to be powered, with the rotational axis of a driving pulley connected to a prime mover. The present invention allows the rotational axes of the two pulleys to be aligned parallel to an accuracy of about 0.2 degrees. The tool of the present invention has first and second bars one end of the second bar being rigidly attached to the first bar and extending from the first bar to form a T-shaped frame for the alignment device.

There are first and second drive pulley engaging pads mounted on each end of the first bar and a third drive pulley engaging pad mounted on the second bar at a location between the ends of the second bar. The three device pulley engaging pad faces are coplanar. The engaging pads are designed to contact one reference face or surface formed on the driving pulley so as to provide a reference plane. The engaging pads each have an adjustable pulley engaging arm juxtaposed the pad, the pulley engaging arms being individually adjustable so as to pull the pulley engaging pads firmly into contact with the driving pulley face.

The second bar has an alignment plate mounted on the end of the second bar distal the first bar, the alignment plate having three locator pins mounted on its surface, the locator pins having coplanar faces defining the plane for locating the surface of the driven pulley. The alignment plate also has means to position the driven pulley with respect to the locating pins until the driven pulley is securely fastened.

DETAILED DESCRIPTION OF PREFERRED EMBODIMENTS

Figure 1:
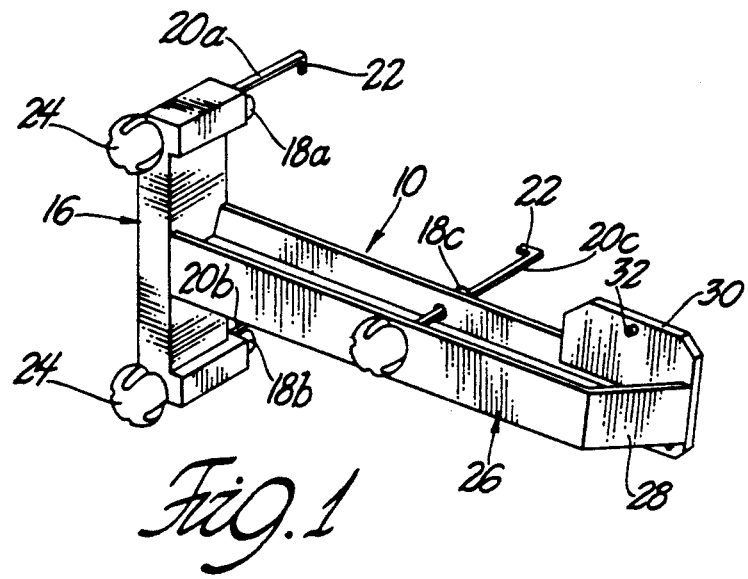
FIG. 1 is a perspective view of one embodiment of this invention.

Referring to the accompanying drawing where like numerals refer to like parts, and initially to FIG. 1, an improved pulley alignment tool 10 is shown. The tool 10 is useful for three dimensional axial alignment of the rotational axis of a wide driven pulley 12 connected to a device to be powered, with the rotational axis of a driving pulley 14 connected to a prime mover. The tool 10 has a first bar 16 with a first driving pulley engaging pad 18a mounted on one end of first bar 16 and a second driving pulley engaging pad 18b mounted on the other end of the first bar, both engaging pads being adapted to contact one face of the driving pulley. A first pulley engaging arm 20a is juxtaposed the first engaging pad 18a and a second pulley engaging arm 20b is juxtaposed the second engaging pad 18b. The pulley engaging arms 20 have a hook portion 22 formed on the free end of the arm the hook being sized so as to allow engagement of the driving pulley 12. The engaging arms 20 are individually adjustable such as by having a threaded portion not visible on the end opposite the hook 20 which mates with a corresponding threaded portion contained in a knob 24 engaging the end of the engaging arm hook so that turning the knob 24 will change the length of the engaging arms 20 individually so as to pull the pulley engaging pads 18 firmly into contact with the driving pulley face 12.

A second bar 26 has one end rigidly attached to the first bar 16 and extends perpendicularly from the first bar to form a T-shaped structure with an unattached end 28, forming a backbone for the adjustment tool. The second bar 26 has a third driving pulley engaging pad 18c mounted at a location between the ends of the second bar and a third driving pulley engaging arm 20c juxtaposed the third driving pulley engaging pad. The third pulley engaging arm 20c is also adjustable to pull the third driving pulley engaging 18c pad firmly into contact with the driving pulley 12 face. The three pulley engaging pad faces 18a, 18b, and 18c are coplaner so when the engaging arms are firmly tightened the second bar 26 is aligned in a plane parallel to the driving pulley face.

The unattached, free end 28 of the second bar 26 has an alignment plate 30 mounted on the free end of the second bar the free end being distal the first bar. The alignment plate 30 has three locator pins 32 extending from the alignment plate surface, the locator pins having coplaner faces. The faces of the locator pins 32 define a plane which is parallel to the plane defined by the three engaging pads 18a, 18b, 18c. The plane defined by the pins 32 will be the plane that corresponds to the desired plane of the driven pulley's face when the pulleys are properly aligned.

Figure 2:
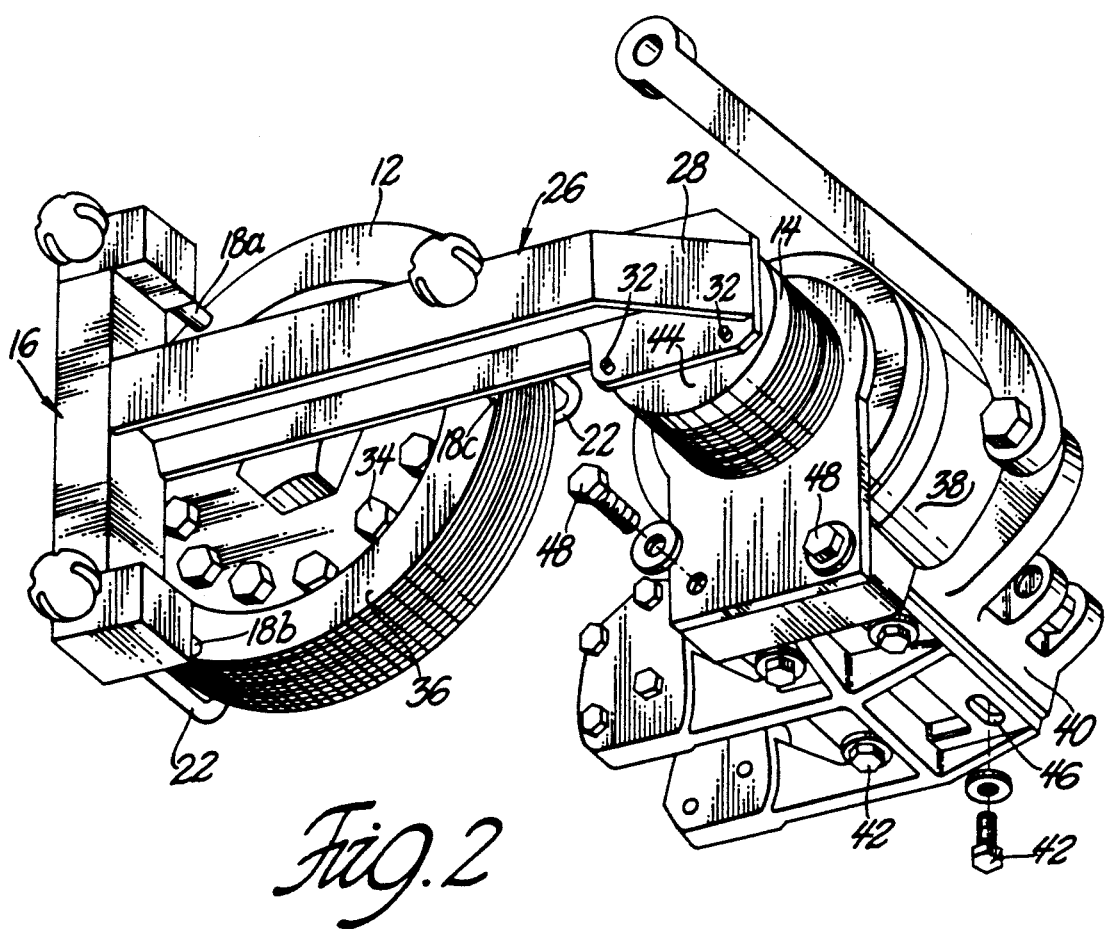
FIG. 2 is a perspective view of the tool shown in FIG. 1 engaging the pulleys to be aligned.

FIG. 2 shows the device of FIG. 1 one attached to and being used to align the generator pulley, the driven pulley, 14 with respect to the driving pulley 12. The view is a perspective taken from slightly below the pulleys to show how the adjustment mechanism works.

The driving pulley 12 is attached to a prime mover (not shown) such as a diesel engine which provides the necessary driving force. The driving pulley 12 is attached to the prime mover crankshaft by means of a plurality of bolts 34 disposed about the axis of the pulley the attachment of the pulley being determined by the prime mover and the pulley configuration necessary. The exact configuration is within the skill of the art and a further exposition is omitted in the interest of brevity.

The first bar 16 of the tool 10 has been located near the driven pulley 12 and all three hooks 22 engaged to the driven pulley. The hooks 22 have been tightened so the engaging pads 18 are firmly contacting a flat machined surface 36 on the front face of the driving pulley. The machined surface 36 provides a planar reference plane which is perpendicular to the axis of the shaft on which the driving pulley 16 is mounted. Thus, the machined surface 36 provides a reference plane to which a driven pulley can be compared for axial alignment.

In FIG. 2 the pulley to be driven is mounted on an alternator designated generally 38. The alternator 38 is in turn mounted on a cradle 40 rigidly attached to the vehicle frame (not shown). The exact details of the cradle mounting are not part of this invention and a full description is omitted in the interest of brevity. The alignment plate 30 with its pins 32 provides the plane to which the driven pulley 14 can be adjusted.

The bottom adjustment bolts 42 are loosened so the alternator 38 can be moved longitudinally along cradle 40 to bring the front face 44 of the driven pulley into contact with one or more of the pins. The elongated apertures 46 formed in the base of the cradle's carriage allow the alternator 38 to be moved longitudinally while still allowing the bolts to be inserted into mating threaded apertures in the alternator housing. After the alternator 38 has been brought to this position, the alternator's axis can be rotated until the face 44 of the driven pulley 14 is near or in contact with all three pins 32. Then the bottom adjustment bolts 42 and front face retention bolts 48 are tightened to the prescribed torque to securely hold the alternator 40 in place. Under normal operating conditions, the degree of freedom possible using carriages like that shown allows the pulleys to be coplanerly aligned within 0.2 degrees which is close enough to coplaner to provide acceptable operating conditions.

Various modifications and alterations will become apparent to those skilled in the art with out departing from the scope and spirit of this invention and it is understood that this invention is not limited to the illustrative embodiments set forth above.

What is claimed is:

1. An improved pulley alignment tool useful for three dimensional axial alignment of the rotational axis of a wide driven pulley connected to a device to be powered, with the rotational axis of a driving pulley connected to a prime mover, including: a first bar having a first driving pulley engaging pad mounted on one end of the first bar and a second driving pulley engaging pad mounted on the other end of the first bar, the engaging pads being adapted to contact one face of the driving pulley, a first pulley engaging arm juxtaposed the first engaging pad and a second pulley engaging arm juxtaposed the second engaging pad, the pulley engaging arms being individually adjustable so as to pull the pulley engaging pads firmly into contact with the driving pulley face;

a second bar having one end rigidly attached to the first bar and extending perpendicularly from the first bar to form a T-shaped structure, the second bar having a third driving pulley engaging pad mounted at a location between the ends of the second bar, the second bar having a third driving pulley engaging arm juxtaposed the third driving pulley engaging pad, the pulley engaging arm being adjustable so as to pull the third driving pulley engaging pad firmly into contact with the driving pulley face, the three engaging pad faces being coplaner; and an alignment plate mounted on the end of the second bar distal the first bar, the alignment plate having three locator pins mounted on its surface, the locator pins having coplaner faces defining the plane for locating the surface of the driven pulley, the alignment plate having means to position the driven pulley with respect to the locating pins until the driven pulley is securely fastened.

* * * * *